(12) United States Patent
Zhang et al.

(10) Patent No.: US 12,247,143 B2
(45) Date of Patent: Mar. 11, 2025

(54) TWO-STAGE EPOXY BONDING OIL, PREPARATION METHOD AND APPLICATION THEREOF

(71) Applicant: SINOROAD TRANSPORTATION SCIENCE AND TECHNOLOGY CO., LTD., Nanjing (CN)

(72) Inventors: Zhixiang Zhang, Nanjing (CN); Kuan Li, Nanjing (CN); Youqiang Pan, Nanjing (CN); Lifeng Chen, Nanjing (CN); Hui Zhang, Nanjing (CN)

(73) Assignee: SINOROAD TRANSPORTATION SCIENCE AND TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 18/034,352

(22) PCT Filed: Feb. 5, 2021

(86) PCT No.: PCT/CN2021/075468
§ 371 (c)(1),
(2) Date: Apr. 27, 2023

(87) PCT Pub. No.: WO2022/110549
PCT Pub. Date: Jun. 2, 2022

(65) Prior Publication Data
US 2023/0383153 A1    Nov. 30, 2023

(30) Foreign Application Priority Data

Nov. 25, 2020  (CN) .................. 202011344435.X

(51) Int. Cl.
*C09J 163/00*   (2006.01)
*C08G 59/02*   (2006.01)
(Continued)

(52) U.S. Cl.
CPC .......... *C09J 163/00* (2013.01); *C08G 59/022* (2013.01); *C09J 11/04* (2013.01); *C09J 11/06* (2013.01); *C09J 2301/50* (2020.08)

(58) Field of Classification Search
CPC . C09J 163/00; C09J 11/04; C09J 11/06; C09J 2301/50; C08G 59/022
(Continued)

(56) References Cited

U.S. PATENT DOCUMENTS

| | | | | |
|---|---|---|---|---|
| 4,448,949 A | * | 5/1984 | Ito | C07C 243/38 |
| | | | | 564/150 |
| 2015/0094400 A1 | | 4/2015 | Zheng et al. | |
| 2017/0349804 A1 | * | 12/2017 | Kellum | C04B 24/12 |

FOREIGN PATENT DOCUMENTS

| | | |
|---|---|---|
| CN | 104059591 A | 9/2014 |
| CN | 106168013 A | 11/2016 |

(Continued)

OTHER PUBLICATIONS

Machine translation of CN104059591 (Year: 2014).*
(Continued)

*Primary Examiner* — David T Karst
(74) *Attorney, Agent, or Firm* — SZDC Law PC

(57) ABSTRACT

A two-stage epoxy bonding oil includes a main agent A and a curing agent B in a weight ratio of 1:1 to 3:1. The curing agent B includes 70 to 90 parts of a linear bifunctional secondary amine curing agent, 10 to 30 parts of a high-melting-point latent curing agent and 1 to 5 parts of an anti-settling agent. A two-stage curing of epoxy bonding oil includes a first-stage curing at room temperature whereby the cured product is in a thermoplastic state and a second-stage curing at 100° C. to 180° C. whereby the cured product is in a thermosetting state. It solves the contradiction between sticking wheels and bonding performance of the bonding layer in field of road and bridge pavement, explor- (Continued)

ing a new direction for the waterproof bonding layer materials in road and bridge pavement such as steel bridge deck pavement, concrete bridge deck pavement and tunnel pavement.

3 Claims, 1 Drawing Sheet

(51) Int. Cl.
  *C09J 11/04* (2006.01)
  *C09J 11/06* (2006.01)
(58) Field of Classification Search
  USPC .......................................................... 528/121
  See application file for complete search history.

(56) References Cited

FOREIGN PATENT DOCUMENTS

| CN | 108219724 A | 6/2018 |
| CN | 108341930 A | 7/2018 |
| CN | 111826110 A | 10/2020 |

OTHER PUBLICATIONS

Machine translation of CN108341930 (Year: 2018).*
Yuan Zhishun et al, "Preparation and application of latent dihydrazide curing agent", Henan Chemical Industry, Issue 11, pp. 11-13 (Jul. 30, 1997).

* cited by examiner

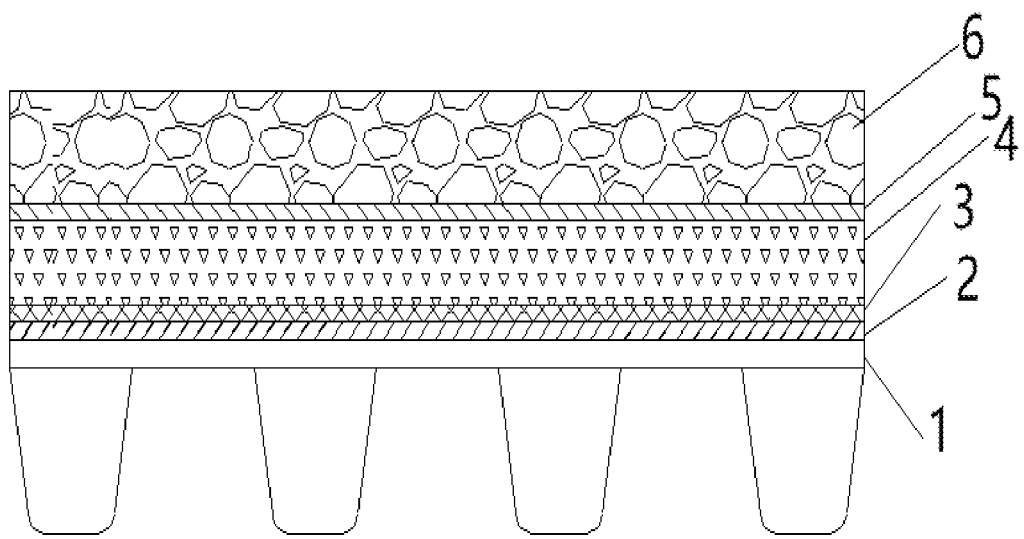

TWO-STAGE EPOXY BONDING OIL, PREPARATION METHOD AND APPLICATION THEREOF

This application is the National Stage Application of PCT/CN2021/075468, filed on Feb. 5, 2021, which claims priority to Chinese Patent Application No. 202011344435.X, filed on Nov. 25, 2020, which is incorporated by reference for all purposes as if fully set forth herein.

TECHNICAL FIELD

The present invention relates to binders for road and bridge pavement, in particular to a two-stage epoxy bonding oil, preparation method and application thereof.

BACKGROUND

There are two problems in the (waterproof) bonding layer in the field of road and bridge pavement such as steel bridge deck pavement, concrete bridge deck pavement and tunnel pavement, one is how to increase the bonding performance between the (waterproof) bonding layer and the upper pavement, and the other is how to reduce the damage to the (waterproof) bonding layer by pavers and transporters during construction. The solutions to these two problems are often contradictory: increasing the bonding performance often requires that the (waterproof) bonding layer is still in an uncured state during the construction of the upper pavement, but the phenomenon of sticking wheels of construction machinery will destroy the integrity of the (waterproof) bonding layer; when the (waterproof) bonding layer is fully cured, although the problem of sticking wheels of construction machinery is solved, the bonding performance between the cured (waterproof) bonding layer and the upper pavement is almost lost.

The above problems are particularly prominent in the field of steel bridge deck pavement. In response to the above technical problems in the industry, the steel bridge deck pavement industry has successively produced the following solutions. Solution 1 uses a thermoplastic asphalt (waterproof) bonding layer, including solvent-based asphalt, hot-sprayed asphalt and non-sticky emulsified asphalt. This solution is mainly implemented in conjunction with the double-layer SMA steel bridge deck pavement structure, and has been applied to the steel bridge deck pavement of the early construction in China such as the Haicang Bridge and the Egongyan Yangtze River Bridge. However, the overall application effect of such solution is not good. Although the asphalt (waterproof) bonding layer solves the problem of sticking wheels of construction machinery to a certain extent, the thermoplastic nature of asphalt does not meet the bonding and shearing requirements of steel bridge deck pavement under high temperature conditions. Solution 2 uses a thermosetting epoxy asphalt (waterproof) bonding layer. This solution is mainly implemented in conjunction with the double-layer epoxy asphalt steel bridge deck pavement structure, and has been applied to the steel bridge deck pavement of Nanjing Second Yangtze River Bridge, Runyang Yangtze River Bridge, and Yangluo Yangtze River Bridge. The overall application effect of such solution is mixed. In order to prevent the damage to the uncured epoxy asphalt (waterproof) bonding layer during the construction of the upper pavement, a set of lateral feeding system has been specially developed. However, the crawler of the paver will still inevitably destroy the uncured epoxy asphalt (waterproof) bonding layer. Solution 3 uses an acrylic (ester) waterproof bonding layer with a multi-layer structure. This solution is mainly used for construction with castable asphalt mixture, and has been applied to the steel bridge deck pavement such as the Tsing Ma Bridge in Hong Kong, the Maanshan Yangtze River Bridge, and the Hong Kong-Zhuhai-Macao Bridge. Although the overall application effect of this solution is good, this solution is only applicable to cast asphalt pavement, and the number of waterproof bonding layers is as many as 4, so the construction is more complicated; on the other hand, due to the low temperature stability of cast asphalt, it is generally only used as the lower layer of steel bridge deck pavement. The acrylic (ester) is not suitable as a bonding layer, so the bonding problem between the upper and lower layers of pavement is still unsolved.

In view of the above-mentioned defects of the existing (waterproof) bonding layer in the field of steel bridge deck pavement, concrete bridge deck pavement and tunnel pavement, the inventor actively researches and innovates based on his rich practical experience and professional knowledge in the design and manufacture of such products for many years and with the application of theories, in order to create a two-stage epoxy bonding oil for road and bridge pavement and its preparation method to solve the contradiction between sticking wheels and bonding performance of the bonding layer in the field of road and bridge pavement such as steel bridge deck pavement, concrete bridge deck pavement and tunnel pavement, making it more practical.

SUMMARY

A first objective of the present invention is to provide a two-stage epoxy bonding oil, which, by optimizing the components of the bonding oil, makes it possible to satisfy the bonding with the pavement while reducing the damage to the bonding layer during the construction process.

To this end, the present invention adopts technical solutions described below.

A two-stage epoxy bonding oil includes a main agent A and a curing agent B in a weight ratio of 1:1 to 3:1, wherein the main agent A includes 80 to 90 parts of a linear phenolic polyglycidyl ether, 10 to 20 parts of a monofunctional reactive diluent and 1 to 3 parts of an epoxy silane coupling agent, and the curing agent B includes 70 to 90 parts of a linear bifunctional secondary amine curing agent, 10 to 30 parts of a high-melting-point latent curing agent and 1 to 5 parts of an anti-settling agent. The two-stage epoxy bonding oil proposed by the present invention is characterized by two-stage curing. The first stage curing is carried out at temperature so that the cured product is dry when pressed with fingers and in a thermoplastic state to avoid wheel sticking, and the second stage curing is further carried out at 100° C. to 180° C. so that the cured product is in a thermosetting state to ensure bonding performance. The two-stage curing mode can solve the contradiction between sticking wheels and bonding performance of the bonding layer in the field of road and bridge pavement.

Preferably, the linear phenolic polyglycidyl ether is one or more of phenol novolac epoxy resin, o-cresol epoxy resin and bisphenol F epoxy resin. The reason for using these materials is that each of these materials, as the main part of the epoxy resin, has a certain epoxy equivalent value. The amount of the two-stage curing agent in the present invention is calculated by multiplying the amine equivalent by epoxy equivalent of the curing agent. In other words, these epoxy resin materials are matched with the curing agent of the present invention.

Preferably, the monofunctional reactive diluent is one or more of butyl glycidyl ether, phenyl glycidyl ether, octyl glycidyl ether, C8-C10 glycidyl ether and C12-C14 glycidyl ether. The linear phenolic polyglycidyl ether is a kind of polymer with more than two epoxy groups in its molecule, and the monofunctional reactive diluent generally refers to low-molecular compounds with one epoxy group, which are characterized by "like dissolves like". The monofunctional reactive diluent is mixed into the linear phenolic polyglycidyl ether. On the one hand, the monofunctional reactive diluent can directly participate in the curing reaction of the linear phenolic polyglycidyl ether and become a part of the cross-linking network structure of the cured product of the two-stage epoxy bonding oil, appropriately increasing the toughness of the cured system without affecting the performance of the cured product; on the other hand, the monofunctional reactive diluent can adjust the viscosity of the two-stage bonding oil system, facilitating construction.

Preferably, the silane coupling agent is one or more of SCA-E87M, SCA-E87E, SCA-E87T, SCA-E87F, SCA-E86M and SCA-E86. The alkoxy group in the silane coupling agent can be hydrolyzed after absorbing moisture to form a chemical bond with the surface of the steel plate layer or epoxy asphalt layer, improving the affinity and resistance to heat and humidity of the two-stage bonding oil. Other active groups in the silane coupling agent can also react with the epoxy resin or curing agent to improve the adhesion of the two-stage bonding oil.

Preferably, the linear bifunctional secondary amine curing agent is prepared by grafting a bifunctional primary amine curing agent with a monoepoxy compound, wherein the bifunctional primary amine curing agent is one or more of hexamethylenediamine, decanediamine, dodecylamine and amino-terminated polyethers, and the monoepoxy compound is one or more of butyl glycidyl ether, benzyl glycidyl ether, octyl glycidyl ether and C12-C14 glycidyl ether. The use of these monoepoxy compounds allows the —$NH_2$ group in the difunctional primary amine curing agent to be partially terminated. The use of these linear bifunctional secondary amine curing agents allows the final linear bifunctional secondary amine curing agent and epoxy resin to be curable at room temperature and the cured product to be thermoplastic.

Preferably, the high-melting-point latent curing agent is an organic acid hydrazide with a melting point between 100° C. and 180° C. obtained through hydrothermal reaction of an organic ester and hydrazine hydrate, the organic acid ester is represented by formula $R_1(COOR_2)_n$, wherein when n=1, $R_1$ is phenyl or o-hydroxyphenyl and $R_2$ is methyl or ethyl, and when n=2, $R_1$ is methylene or ethylene and $R_2$ is methyl or ethyl.

Preferably, the anti-settling agent is one or more of hydrophilic fumed silica, hydrophobic fumed silica R974 and modified bentonite.

A second objective of the present invention is to provide a method for the preparation of two-stage epoxy bonding oil, which, by optimizing the components of the bonding oil and regulating the preparation parameters, makes the final product to satisfy the bonding with the pavement while reducing the damage to the bonding layer during the construction process.

To this end, the present invention adopts technical solutions described below.

A method for the preparation of two-stage epoxy bonding oil, including the following steps:

S1: adding 1 to 5 parts (molar mass) of a bifunctional primary amine curing agent into the reactor and raising the temperature to 80° C., and slowly adding 2 to 10 parts (molar mass) of a monofunctional epoxy compound dropwise into the reactor for 2 h, with a material temperature of 80° C. and a stirring rate of 60 r/min, whereby a linear bifunctional secondary amine curing agent is obtained;

S2: adding 1 to 5 parts (molar mass) of hydrazine hydrate into the reactor and raising the temperature to 70° C., slowly adding 1 to 5 parts of 50% concentration isopropanol solution of an organic acid ester into the reactor dropwise for 2 h, followed by reaction for 5 h, with a material temperature of 70° C. and a stirring rate of 60 r/min, then adding an appropriate amount of xylene into the reactor and distilling the azeotrope of xylene, water, hydrazine hydrate and alcohol under vacuum conditions, whereby an organic acid hydrazide, namely, a high-melting-point latent curing agent is obtained;

S3: weighing a linear phenolic polyglycidyl ether, an active diluent and an epoxy silane coupling agent, and stirring the same for 60 minutes at 60° C., whereby a main agent A is obtained;

S4: weighing the linear bifunctional secondary amine curing agent, the high-melting-point latent curing agent and an anti-settling agent, and stirring the same for 60 minutes at 50° C., whereby a curing agent B is obtained; and S5: stirring and mixing the main agent A and the curing agent B, whereby the two-stage epoxy bonding oil is obtained.

A third objective of the present invention is to provide an application of two-stage epoxy bonding oil. The two-stage epoxy bonding oil with optimized performance is applied to steel bridge deck pavement, concrete bridge deck pavement, and tunnel pavement as a waterproof bonding layer material for road and bridge pavement, imparting good adhesion to the bridge deck layers and at the same time avoiding the damage to the structural layer caused by the phenomenon of sticking wheels during the construction process, ensuring the quality of the project.

To this end, the present invention adopts technical solutions described below.

The two-stage epoxy bonding oil of the present invention is mainly used in steel bridge deck pavement, concrete bridge deck pavement and tunnel pavement as a waterproof bonding layer material for road and bridge pavement. Application of the two-stage epoxy bonding oil includes the following steps:

A1: substrate cleaning, including cleaning the substrate to improve bonding, specifically by sandblasting, shot blasting and the like;

A2: spraying a silane interface agent to form a viscosified modified anti-corrosion layer on the cleaned substrate, including preparing the silane interface agent according to the mass ratio of 1 to 2% silane coupling agent, 85 to 99% isopropanol, 0 to 10% water, 0 to 1.5% acetic acid, and then spraying the prepared silane interface agent to the cleaned substrate in A1 through mechanical spraying, wherein the spraying amount varies for different substrates: 0.1 to 0.2 kg/m² for the steel plate substrate and 0.2 to 0.5 kg/m² for concrete substrate.

A3: coating the two-stage epoxy bonding oil to form a (waterproof) bonding layer, including, after the silane interface agent is dried to form a film, coating the two-stage epoxy bonding oil by manual scraping, roller coating or mechanical spraying, wherein the coating amount varies for different substrates: 0.4 to 0.6 kg/m² for the steel plate substrate and 0.6 to 1.0 kg/m² for concrete substrate;

A4: first-stage curing, including curing the two-stage epoxy bonding oil, wherein the completion of the first-stage curing is indicated by fact that the cured product is dry when pressed with fingers;

A5: construction with a hot mixture, including performing construction with hot mixture on the two-stage epoxy bonding oil after the first-stage curing in order to form a protective layer or wear layer, wherein the two-stage epoxy bonding oil after the first-stage curing can be completely melted under the heat of the hot mixture; and A6: second-stage curing, including further curing the two-stage epoxy bonding oil using the residual heat of the protective layer or wear layer to form a thermosetting cured product.

With the technical solutions described above, the present invention achieves the following advantageous effects.

1. The present invention adopts a mixed curing agent, wherein the bifunctional secondary amine curing agent is prepared by grafting a bifunctional primary amine curing agent with a monoepoxy compound. The introduction of monoepoxy compound makes the —NH₂ group in the bifunctional primary amine curing agent partially terminated, such that the obtained bifunctional secondary amine curing agent can, on the one hand, realize the initial curing of epoxy bonding oil at room temperature, and on the other hand, reduce the cross-linking density of the first-stage cured product so that it is still in a thermoplastic state, which is the main reason that the waterproof bonding layer is ensured to be still thermoplastic after the first-stage curing is completed.

2. Another important component of the mixed curing agent is the high-melting-point latent curing agent, which is an organic acid hydrazide prepared by hydrothermal reaction of organic acid ester and hydrazine hydrate. The melting point of organic acid hydrazide is in the range of 100° C. to 180° C., so it does not participate in the first-stage curing reaction of epoxy bonding oil. When the hot mixture acts on the epoxy bonding oil after one-stage curing, the high-melting-point organic acid hydrazide curing agent gradually melts into a liquid and undergoes a second-stage curing reaction with the epoxy bonding oil which has undergone the first-stage curing, whereby a thermosetting epoxy bonding layer is formed under the action of residual heat of the pavement.

3. Aiming at the contradiction between sticking wheels and bonding performance of the (waterproof) bonding layer in the field of the road and bridge pavement such as steel bridge deck pavement, concrete bridge deck pavement and tunnel pavement, the present invention achieves the preparation of epoxy bonding oil with two-stage curing characteristics by compounding bifunctional secondary amine curing agent and high-melting-point latent curing agent. The epoxy bonding oil of the present invention is cured at room temperature in the first stage, and the cured product is not sticky to the wheels, is in a thermoplastic state and can be completely melted above 120° C. It is cured at 100° C. to 180° C. in the second stage and the cured product is in a thermosetting state, so as to ensure the bonding effect between the substrate and the upper pavement.

DESCRIPTION OF THE DRAWINGS

FIG. 1 is a schematic diagram of steel deck pavement structure.

Reference signs: 1. Steel bridge deck, 2. Anti-corrosion layer, 3. Waterproof bonding layer, 4. Protective layer, 5. Bonding layer, 6. Wear layer.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a part of the embodiments of the present invention, rather than all the embodiments.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

FIG. 1 is a schematic diagram of a conventional steel bridge deck pavement structure. The upper surface of steel bridge deck 1 is provided with an anti-corrosion layer 2, a waterproof bonding layer 3, a protective layer 4, a bonding layer 5 and a wear layer 6 from bottom to top.

Example 1

1 part (molar mass) of hexamethylenediamine was added into the reactor and the temperature was raised to 80° C.; 2 parts (molar mass) of butyl glycidyl ether was slowly added into the reactor dropwise for 2 h, with a material temperature of 80° C. and a stirring rate of 60 r/min, whereby a linear bifunctional secondary amine curing agent was obtained; 1 part (molar mass) of hydrazine hydrate was added into the reactor and the temperature was raised to 70° C.; 1 part of 50% concentration isopropanol solution of dimethyl malonate was slowly added into the reactor dropwise for 2 h, followed by reaction for 5 h, with a material temperature of 70° C. and a stirring rate of 60 r/min, then an appropriate amount of xylene was added into the reactor and the azeotrope of xylene, water, hydrazine hydrate and alcohol was distilled under vacuum conditions, whereby an organic acid hydrazide, namely, a high-melting-point latent curing agent was obtained.

80 parts of linear phenolic polyglycidyl ether, 10 parts of benzyl glycidyl ether and 1 part of SCA-E87M were stirred at 60° C. for 60 minutes to obtain a main agent A; 70 parts of the bifunctional secondary amine curing agent, 10 parts of the high-melting-point latent curing agent and 1 part of fumed silica R974 anti-settling agent were stirred at 50° C. for 60 minutes to obtain a curing agent B, and then the main agent A and the curing agent B were mixed to obtain a two-stage epoxy bonding oil.

The construction was carried out by the steps of sand blasting and shot blasting on the substrate, spraying of silane interface agent, coating of two-stage epoxy bonding oil (to form the waterproof bonding layer 3), first-stage curing, construction with hot mixture, and second-stage curing.

Example 2

1 part (molar mass) of hexamethylenediamine was added into the reactor and the temperature was raised to 80° C.; 2 parts (molar mass) of butyl glycidyl ether was slowly added into the reactor dropwise for 2 h, with a material temperature of 80° C. and a stirring rate of 60 r/min, whereby a linear bifunctional secondary amine curing agent was obtained; 1 part (molar mass) of hydrazine hydrate was added into the reactor and the temperature was raised to 70° C.; 1 part of 50% concentration isopropanol solution of dimethyl malonate was slowly added into the reactor dropwise for 2 h, followed by reaction for 5 h, with a material temperature of 70° C. and a stirring rate of 60 r/min, then an appropriate amount of xylene was added into the reactor and the azeotrope of xylene, water, hydrazine hydrate and alcohol was distilled under vacuum conditions, whereby an organic acid hydrazide, namely, a high-melting-point latent curing agent was obtained;

90 parts of linear phenolic polyglycidyl ether, 20 parts of benzyl glycidyl ether and 3 parts of SCA-E87M were stirred at 60° C. for 60 minutes to obtain a main agent A; 90 parts of the bifunctional secondary amine curing agent, 30 parts of the high-melting-point latent curing agent and 5 parts of fumed silica R974 anti-settling agent were stirred at 50° C. for 60 minutes to obtain a curing agent B, and then the main agent A and the curing agent B were mixed to obtain a two-stage epoxy bonding oil.

The construction was carried out by the steps of sand blasting and shot blasting on the substrate, spraying of silane interface agent, coating of two-stage epoxy bonding oil, first-stage curing, construction with hot mixture, and second-stage curing.

Example 3

1 part (molar mass) of decanediamine was added into the reactor and the temperature was raised to 80° C.; 2 parts (molar mass) of octyl glycidyl ether was slowly added into the reactor dropwise for 2 h, with a material temperature of 80° C. and a stirring rate of 60 r/min, whereby a linear bifunctional secondary amine curing agent was obtained; 1 part (molar mass) of hydrazine hydrate was added into the reactor and the temperature was raised to 70° C.; 1 part of 50% concentration isopropanol solution of diethyl succinate was slowly added into the reactor dropwise for 2 h, followed by reaction for 5 h, with a material temperature of 70° C. and a stirring rate of 60 r/min, then an appropriate amount of xylene was added into the reactor and the azeotrope of xylene, water, hydrazine hydrate and alcohol was distilled under vacuum conditions, whereby an organic acid hydrazide, namely, a high-melting-point latent curing agent was obtained.

80 parts of linear phenolic polyglycidyl ether, 20 parts of benzyl glycidyl ether and 1 part of SCA-E87E were stirred at 60° C. for 60 minutes to obtain a main agent A; 80 parts of the bifunctional secondary amine curing agent, 20 parts of the high-melting-point latent curing agent and 2 parts of fumed silica R974 anti-settling agent were stirred at 50° C. for 60 minutes to obtain a curing agent B, and then the main agent A and the curing agent B were mixed to obtain a two-stage epoxy bonding oil.

The construction was carried out by the steps of sand blasting and shot blasting on the substrate, spraying of silane interface agent, coating of two-stage epoxy bonding oil, first-stage curing, construction with hot mixture, and second-stage curing.

Example 4

1 part (molar mass) of amino-terminated polyether was added into the reactor and the temperature was raised to 80° C.; 2 parts (molar mass) of C8-C10 alkyl glycidyl ether was slowly added into the reactor dropwise for 2 h, with a material temperature of 80° C. and a stirring rate of 60 r/min, whereby a linear bifunctional secondary amine curing agent was obtained; 1 part (molar mass) of hydrazine hydrate was added into the reactor and the temperature was raised to 70° C.; 1 part of 50% concentration of isopropanol solution of ethyl benzoate was slowly added into the reactor dropwise for 2 h, followed by reaction for 5 h, with a material temperature of 70° C. and a stirring rate of 60 r/min, then an appropriate amount of xylene was added into the reactor and the azeotrope of xylene, water, hydrazine hydrate and alcohol was distilled under vacuum conditions, whereby an organic acid hydrazide, namely, a high-melting-point latent curing agent was obtained.

85 parts of linear phenolic polyglycidyl ether, 15 parts of benzyl glycidyl ether and 2 parts of SCA-E87F were stirred at 60° C. for 60 minutes to obtain a main agent A; 90 parts of the bifunctional secondary amine curing agent, 10 parts of the high-melting-point latent curing agent and 2 parts of fumed silica R974 anti-settling agent were stirred at 50° C. for 60 minutes to obtain a curing agent B, and then the main agent A and the curing agent B were mixed to obtain a two-stage epoxy bonding oil.

The construction was carried out by the steps of sand blasting and shot blasting on the substrate, spraying of silane interface agent, coating of two-stage epoxy bonding oil, first-stage curing, construction with hot mixture, and second-stage curing.

Example 5

1 part (molar mass) of amino-terminated polyether was added into the reactor and the temperature was raised to 80° C.; 2 parts (molar mass) of phenyl glycidyl ether was slowly added into the reactor dropwise for 2 h, with a material temperature of 80° C. and a stirring rate of 60 r/min, whereby a linear bifunctional secondary amine curing agent was obtained; 1 part (molar mass) of hydrazine hydrate was added into the reactor and the temperature was raised to 70° C.; 1 part of 50% concentration isopropanol solution of methyl salicylate was slowly added into the reactor dropwise for 2 h, followed by reaction for 5 h, with a material temperature of 70° C. and a stirring rate of 60 r/min, then an appropriate amount of xylene was added into the reactor and the azeotrope of xylene, water, hydrazine hydrate and alcohol was distilled under vacuum conditions, whereby an organic acid hydrazide, namely, a high-melting-point latent curing agent was obtained.

90 parts of linear phenolic polyglycidyl ether, 10 parts of benzyl glycidyl ether and 3 parts of SCA-E86M were stirred at 60° C. for 60 minutes to obtain a main agent A; 85 parts of the bifunctional secondary amine curing agent, 15 parts of the high-melting-point latent curing agent and 3 parts of modified bentonite anti-settling agent were stirred at 50° C. for 60 minutes to obtain a curing agent B, and then the main agent A and the curing agent B were mixed to obtain a two-stage epoxy bonding oil.

The construction was carried out by the steps of sand blasting and shot blasting on the substrate, spraying of silane interface agent, coating of two-stage epoxy bonding oil, first-stage curing, construction with hot mixture, and second-stage curing.

Comparative Example 1

1 part (molar mass) of hexamethylenediamine was added into the reactor and raising the temperature to 80° C.; 2 parts (molar mass) of butyl glycidyl ether was slowly added into the reactor dropwise for 2 h, with a material temperature of 80° C. and a stirring rate of 60 r/min, whereby a linear bifunctional secondary amine curing agent is obtained.

80 parts of linear phenolic polyglycidyl ether, 10 parts of benzyl glycidyl ether and 1 part of SCA-E87M were stirred at 60° C. for 60 minutes to obtain a main agent A; 80 parts of the bifunctional secondary amine curing agent and 1 part of fumed silica R974 anti-settling agent were stirred at 50° C. for 60 minutes to obtain a curing agent B, and then the main agent A and the curing agent B were mixed to obtain a two-stage epoxy bonding oil.

The construction was carried out by the steps of sand blasting and shot blasting on the substrate, spraying of silane interface agent, coating of two-stage epoxy bonding oil, first-stage curing, construction with hot mixture, and second-stage curing.

Comparative Example 2

1 part (molar mass) of hydrazine hydrate was added into the reactor and the temperature was raised to 70° C.; 1 part of 50% concentration isopropanol solution of dimethyl malonate was slowly added into the reactor dropwise for 2 h, followed by reaction for 5 h, with a material temperature of 70° C. and a stirring rate of 60 r/min, then adding an appropriate amount of xylene into the reactor and distilling the azeotrope of xylene, water, hydrazine hydrate and alcohol under vacuum conditions, whereby an organic acid hydrazide, namely, a high-melting-point latent curing agent is obtained.

80 parts of linear phenolic polyglycidyl ether, 10 parts of benzyl glycidyl ether and 1 part of SCA-E87M were stirred at 60° C. for 60 minutes to obtain a main agent A; 30 parts of the high-melting-point latent curing agent and 1 part of fumed silica R974 anti-settling agent were stirred at 50° C. for 60 minutes to obtain a curing agent B, and then the main agent A and the curing agent B were mixed to obtain a two-stage epoxy bonding oil.

The construction was carried out by the steps of sand blasting and shot blasting on the substrate, spraying of silane interface agent, coating of two-stage epoxy bonding oil, first-stage curing, construction with hot mixture, and second-stage curing.

Comparative Example 3

80 parts of linear phenolic polyglycidyl ether, 10 parts of benzyl glycidyl ether and 1 part of SCA-E87M were stirred at 60° C. for 60 minutes to obtain a main agent A; 40 parts of curing agent (651) and 1 part of fumed silica R974 anti-settling agent were stirred at 50° C. for 60 minutes to obtain a curing agent B, and then the main agent A and the curing agent B were mixed to obtain a two-stage epoxy bonding oil.

The construction was carried out by the steps of sand blasting and shot blasting on the substrate, spraying of silane interface agent, coating of two-stage epoxy bonding oil, first-stage curing, construction with hot mixture, and second-stage curing.

The performance test results of the two-stage epoxy bonding oil in Examples 1-5 and Comparative Examples 1-3 are shown in the table below.

TABLE 1

Performance test results of the two-stage epoxy bonding oil

| Test Item | | Test Method | Example 1 | Example 2 | Example 3 | Example 4 | Example 5 | Comparative Example 1 | Comparative Example 2 | Comparative Example 3 |
|---|---|---|---|---|---|---|---|---|---|---|
| Melting point of high-melting-point latent curing agent/° C. | | — | 153 | 163 | 114 | 151 | 148 | — | 140 | — |
| 23° C. Tensile properties | Tensile strength/MPa | GB/T 16777 | 4.2 | 6.8 | 5.6 | 4.5 | 5.2 | 1.4 | 0.9 | 6.5 |
| | Elongation at break/% | | 513 | 487 | 498 | 523 | 435 | 690 | 452 | 27 |
| Water impermeability (0.3 MPa, 24 h) | | | Impermeable | Impermeable | Impermeable | Impermeable | Impermeable | Impermeable | Impermeable | Impermeable |
| Water absorption at 25° C./% | | GB/T 1034 | 0.2 | 0.1 | 0.2 | 0.1 | 0.2 | 2.8 | 2.3 | 1.1 |
| Melting Behavior (150° C., 30 min) | | — | Melt | Melt | Melt | Melt | Melt | Melt | Melt | Does not melt |
| Bonding strength to steel plate at 25° C./MPa | Without thermal shock | GB/T 5210 | 6.8 | 9.4 | 8.9 | 7.8 | 8.2 | 2.1 | 1.8 | 12 |
| | With thermal shock | | 6.5 | 9.6 | 8.2 | 8.4 | 7.3 | 2.2 | 1.7 | 3.3 |
| Bonding strength to mixture at 25° C./MPa | Epoxy asphalt mixture | JTG/T 3364-02 | >2 MPa, and all epoxy asphalt mixture cohesive failure | | | | | 0.4 MPa | 0.3 MPa | 0.5 MPa |
| | Modified asphalt mixture | | >1 MPa, and all modified asphalt mixture cohesive failure | | | | | 0.3 MPa | 0.3 MPa | 0.4 MPa |

Through the verification of the above experimental results, aiming at the contradiction between sticking wheels and bonding performance of the (waterproof) bonding layer in the field of the road and bridge pavement such as steel bridge deck pavement, concrete bridge deck pavement and tunnel pavement, the present invention achieves the preparation of epoxy bonding oil with two-stage curing characteristics by compounding bifunctional secondary amine curing agent and high-melting-point latent curing agent. With the first-stage curing at room temperature, the cured product is not sticky to wheels; with the second-stage curing at 100° C. to 180° C., the cured product is in thermosetting state to ensure the bonding effect between the substrate and the upper pavement, effectively resolving the above contradiction and achieving a good bonding effect without sticking the wheels.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A two-stage epoxy bonding oil consisting of a main agent A and a curing agent B in a weight ratio of 1:1 to 3:1,
   wherein the curing agent B consists of 80 to 90 parts of a linear bifunctional secondary amine curing agent, 10 to 20 parts of a high-melting-point latent curing agent and 1 to 3 parts of an anti-settling agent,
   wherein the linear bifunctional secondary amine curing agent is prepared by grafting a bifunctional primary amine curing agent with a monoepoxy compound,
   wherein the bifunctional primary amine curing agent is selected from the group consisting of hexamethylenediamine, decanediamine, and amino-terminated polyethers,
   wherein the two-stage epoxy bonding oil is prepared by a method consisting of the following steps:
   S1: adding 1 part (molar mass) of the bifunctional primary amine curing agent into the reactor and raising the temperature to 80° C., and slowly adding 2 parts (molar mass) of the monoepoxy compound dropwise into the reactor, followed by stirring for reaction, whereby the linear bifunctional secondary amine curing agent is obtained;
   S2: adding 1 to 5 parts (molar mass) of hydrazine hydrate into the reactor and raising the temperature to 70° C., slowly adding 1 parts of 50% concentration isopropanol solution of an organic acid ester into the reactor dropwise, then adding an appropriate amount of xylene into the reactor and distilling the azeotrope of xylene, water, hydrazine hydrate and alcohol under vacuum conditions, whereby an organic acid hydrazide, namely, a high-melting-point latent curing agent is obtained;
   S3: weighing 80 parts (molar mass) of a linear phenolic polyglycidyl ether, 10-20 parts (molar mass) of a monofunctional reactive diluent and 1-3 parts (molar mass) of an epoxy silane coupling agent, and stirring the same for 60 minutes at 60° C., whereby a main agent A is obtained;
   S4: weighing the linear bifunctional secondary amine curing agent, the high-melting-point latent curing agent and the anti-settling agent, and stirring the same for 60 minutes at 50° C., whereby a curing agent B is obtained; and
   S5: stirring and mixing the main agent A and the curing agent B, whereby the two-stage epoxy bonding oil is obtained,
   wherein the monoepoxy compound is butyl glycidyl ether,
   wherein the organic acid hydrazide has a melting point between 100° C. and 180° C. and is obtained through a hydrothermal reaction of an organic ester and hydrazine hydrate,
   wherein the organic acid ester is selected from the group consisting of dimethyl malonate, diethyl succinate, ethyl benzoate, and methyl salicylate,
   wherein the anti-settling agent is selected from the group consisting of hydrophobic fumed silica R974 and modified bentonite,
   wherein the linear phenolic polyglycidyl ether is selected from the group consisting of phenol novolac epoxy resin, o-cresol epoxy resin and bisphenol F epoxy resin,
   wherein the monofunctional reactive diluent is benzyl glycidyl ether, and
   wherein the epoxy silane coupling agent is selected from the group consisting of 3-glycidoxypropyltrimethoxysilane (SCA-E87M), 3-glycidoxpropyltriethoxysilane (SCA-E87E), 3-glycidoxypropylmethyldimethoxysilane (SCA-E87F), and 2-(3,4-epoxycyclohexyl)ethyl] trimethoxysilane (SCA-E86M).

2. An application of two-stage epoxy bonding oil according to claim 1, comprising the following steps:
   A1: substrate cleaning, comprising cleaning a bonding substrate;
   A2: spraying a silane interface agent, comprising preparing the silane interface agent and spraying the prepared silane interface agent to the cleaned substrate in A1 through mechanical spraying to realize viscosity-increasing and modification of the cleaned substrate;
   A3: coating the two-stage epoxy bonding oil, comprising coating the two-stage epoxy bonding oil to the modified cleaned substrate to form a bonding layer;
   A4: first-stage curing, comprising curing the two-stage epoxy bonding oil, wherein the completion of the first-stage curing is indicated by fact that the cured product is dry when pressed with fingers;
   A5: construction with a hot mixture, comprising performing construction with the hot mixture on the two-stage epoxy bonding oil after the first-stage curing in order to form a protective layer or wear layer; and
   A6: second-stage curing, comprising further curing the two-stage epoxy bonding oil using the residual heat of the protective layer or wear layer to form a thermosetting cured product.

3. The application of two-stage epoxy bonding oil according to claim 2, wherein the silane interface agent is prepared according to the mass ratio of 1 to 2% silane coupling agent, 85 to 99% isopropanol, 0 to 10% water, and 0 to 1.5% acetic acid.

* * * * *